United States Patent [19]

McBrien et al.

[11] Patent Number: 5,168,534
[45] Date of Patent: Dec. 1, 1992

[54] CASCADED OPTIC MODULATOR ARRANGEMENT

[75] Inventors: Gregory J. McBrien, Cromwell; James D. Farina, Tolland, both of Conn.

[73] Assignee: United Technologies Corporation, Hartford, Conn.

[21] Appl. No.: 803,818

[22] Filed: Dec. 9, 1991

[51] Int. Cl.$^5$ .............................................. G02B 6/12
[52] U.S. Cl. ............................................ 385/3; 385/2
[58] Field of Search .................................. 385/3, 2, 4

[56] References Cited

U.S. PATENT DOCUMENTS 5,101,450  3/1992  Olshansky ............................ 385/3

OTHER PUBLICATIONS

Zolotov, E. M., et al., "Integrated Optical Mach-Zehnder Modulator with a Linearized Modulation Characteristic", *Sov. J. Quantum Electron*, 18(3) 1988, pp. 401-402.
Bodeep, G. E. et al., "Comparison of Second- and Third-Order Distortion in Intensity Modulated InGaAsP Lasers and a LiNbO$_3$ External Modulator", OFC '89, paper WK-2.
DeRidder, R. M. et al., "Feedforward Compensation of Integrated Optic Modulator Distortion", paper WH-5.
Wu, Jingshown et al., "Linearization of Laser-Diode Nonlinearity of Broadband Analogue Fiber-Optic Communication", *International Journal of Optoelectronics*, 1988, vol. 3, No. 6, pp. 523-533.
Farwell, Mark et al., "An Electrooptic Intensity Modulator with Improved Linearity", *IEEE Photonics Technology Letters*, 1991, vol. 3, No. 9, pp. 792-795.
Suto, Ko-ichi, et al., "Intermodulation Distortion in 48 TV Channel FM-FDM Optical Transmission", *IEEE Photonics Technology Letters*, 1991, vol. 3, No. 9, pp. 844-846.
Lin, Z.-Q. et al., "Reduction of Intermodulation Distortion of Interferometric Optical Modulators Through Incoherent Mixing of Optical Waves", *Electronics Letters*, 1990, vol. 26, No. 23, pp. 1980-1982.
Childs, R. B. et al., "Predistortion Linearization of Directly Modulated DFB Lasers and External Modulators for AM Radio Transmission", *Technical Digest, Optical Fiber Communication Conf.*, Optical Society of America, Wash., D.C., 1990, paper WH-6.
Donaldson, A. et al., "Linearity Considerations in High Performance Amplitude Modulators", *IEE Colloquim on 'Analogue Optical Communications'*, Digest No. 156, Dec. 1989, pp. 4/1-5.
Lin, Z.-Q. et al., "Waveguide Modulators with Extended Linear Dynamic Range-a Theoretical Prediction", *IEEE Photonics Technology Letters*, vol. 2, No. 12, Dec. 1990, pp. 884-886.
Liu, P.-L. et al., "In Search of a Linear Electrooptic Amplitude Modulator", *IEEE Photonics Technology Letters*, vol. 3, No. 2, Feb. 1991, pp. 144-146.

*Primary Examiner*—John D. Lee
*Assistant Examiner*—Phan T. Heartney
*Attorney, Agent, or Firm*—Richard H. Kosakowski

[57] ABSTRACT

A pair of interferometers, such as Mach-Zehnders, are disposed in a series arrangement in which a signal fed to an input of the first Mach-Zehnder is modulated by an optic modulator, the modulated signal is fed to an input of the second Mach-Zehnder and is modulated by a second optic modulator, the two optic modulators effectively being connected in a series or cascade arrangement. The phase offset of both modulators and the contrast of one modulator are adjusted to minimize both second and third order harmonics inherently generated by the modulation process of each modulator, thereby providing an improved linear response in the output signal of the second Mach-Zehnder.

20 Claims, 3 Drawing Sheets

CASCADED OPTIC MODULATOR ARRANGEMENT

DESCRIPTION

1. Technical Field

This invention relates to optic modulators, and more particularly to a cascaded optic modulator arrangement for improved modulator linear response.

2. Background Art

A trend in optical communication systems is to integrate functions traditionally performed by discrete optical components onto an integrated optic ("IO") device. These functions include polarizers, filters, modulators, directional couplers, waveguides, etc. The IO device is typically fabricated from a substrate of lithium niobate, $LiNbO_3$, or lithium tantalate, $LiTaO_3$, and has a waveguide formed on a major surface. Common waveguides include the Mach-Zehnder and Balanced-Bridge interferometers. In the Mach-Zehnder, an input optical signal from, e.g., a laser light source, is split at a Y-junction in the waveguide into two equal components. Each component travels in a corresponding arm of the waveguide before being recombined at a second Y-junction.

To modulate the optical signals in the Mach-Zehnder, one or more electrooptic modulators comprising electrodes are formed on the waveguide surface in the vicinity of the arms. A time varying voltage applied to the electrodes produces an electric field in the IO device substrate. "Mach-Zehnder" refers to the waveguide Y-junctions and arms, along with the modulators.

In accordance with the well-known electrooptic effect, the electric field effectively changes the relative indices of refraction, and, thus, the optical path lengths, of the waveguide arms. Modulation of the optical input signal occurs since the relative phase of the optical signals in the arms varies according to the instantaneous amplitude of the time varying electrical signal driving the electrodes. The varying phase results in a varying amplitude of the intensity of the optical signal at the interferometer output.

Since the modulator operates on light interference principles, its transfer function is a nonlinear cosine curve. When used to modulate radio frequency energy ("RF"), the modulator then generates undesirable harmonics. When the modulator is driven symmetrically about the optical half intensity point of the cosine curve (i.e., the approximate linear region of the curve), fundamental and odd harmonics predominate in the Mach-Zehnder's output. The amplitudes of the higher harmonics increase as the modulating voltage is increased. Thus, the Mach-Zehnder's output deviates noticeably from that which would be obtained with a perfectly linear device. When the modulator is biased such that the optical output is either at a maximum or minimum, even harmonics predominate and the power in the fundamental drops to zero. (see Donaldson, A. et al., "Linearity Considerations in High Performance Amplitude Modulators", *IEE Colloquium on Analogue Optical Communications'*, Digest No. 156, December 1989, pp.4/1–5).

This harmonic intermodulation distortion is a problem in a multichannel optical communication system, e.g., cable television ("CATV"). A CATV system may have 75 channels multiplexed for transmission in a frequency range of 50-500 MHz. The large number of closely-spaced carriers places strict requirements on the linearity of system elements in order to reduce undesired harmonic distortions. The inherent cosine response of an electrooptic modulator does not provide the requisite linearity. To lessen the effect of intermodulation distortion without increasing the modulator linearity, the intercarrier separation may be increased; however, this is an inefficient use of the allotted frequency spectrum.

Attempts at linearizing the modulator's response have been made so as to reduce the amplitude of the higher order distortions, particularly the second and third order harmonics. Typical amplitude modulation (AM) transmission requirements for second and third order harmonics are −60dBc relative to the fundamental.

Donaldson et al. above allege that low intermodulation distortion can only be guaranteed if the modulation depth is restricted. However, such restriction reduces the transmitted signal strength. Thus, to improve the signal to noise ratio it is necessary to increase the transmitted optical power, which requires a more expensive optical source.

It is known in the art to use directional couplers, alone or in combination with Mach-Zehnders. Such schemes employ exponential or other trigonometric terms to reduce the second and third order terms. See Lin, Z.-Q. et al., "Waveguide Modulators with Extended Linear Dynamic Range—A Theoretical Prediction", *IEEE Photonics Technology Letters*, Vol. 2, No. 12, December 1990, pp. 884–886; Liu, P.-L. et al., "In Search of a Linear Electrooptic Amplitude Modulator", *IEEE Photonics Technology Letters*, Vol. 3, No. 2, February 1991, pp. 144–146. However, a problem is that creating a parallel optical structure requires complex phase and amplitude adjustment schemes. Further, coherent addition of correction terms requires the difficult task of maintaining the optical phase alignment of one or more parallel branches.

Optical linearization schemes are known in which two parallel Mach-Zehnders achieve incoherent combination of light intensities. For example, see Lin, Z.-Q. et al., "Reduction of Intermodulation Distortion of Interferometric Optical Modulators Through Incoherent Mixing of Optical Waves", *Electronics Letters*, 1990, Vol. 26, No. 23, pp. 1980-1982. However, such a scheme provides only 30 to 40 dB of distortion reduction. Further, its usefulness may be limited to moderate modulation frequency and transmission distance, from wavelength dispersion.

It is also known to use electrical feedforward compensation and predistortion schemes to reduce the distortions. An exemplary predistortion circuit consists of a nonlinear device which generates distortion products which are equal in amplitude, but opposite in phase with the distortion products produced by the modulator. (See Childs, R. B. et al., "Predistortion Linearization of Directly Modulated DFB Lasers and External Modulators for AM Radio Transmission", *Technical Digest, Optical Fiber Communication Conf.*, Optical Society of America, Wash. D.C., 1990, paper WH-6). An exemplary feedforward scheme is Saleh, A. M. et al., "Compensation of Nonlinearity in Semiconductor Optical Amplifiers", *Electronics Letters*, 1988, Vol. 24, No. 15, pp. 950–952. However, feedforward and predistortion schemes require phase and gain accuracy to be tightly constrained.

DISCLOSURE OF INVENTION

Objects of the present invention include provision of improved linearity in the transfer function of an arrangement of electrooptic modulators.

Further objects include the reduction of amplitude of second and third order harmonics inherently generated by optic modulators.

According to the present invention, two optic interferometers, such as Mach-Zehnders, are disposed in a series arrangement in which an optical signal fed to an input of the first Mach-Zehnder is modulated by an optic modulator, the modulated optical signal is fed to an input of the second Mach-Zehnder and is modulated by a second optic modulator, the two optic modulators effectively being connected in a series (cascade) arrangement; the phase offset of both modulators, and contrast of one modulator, are adjusted to minimize both second and third order harmonics inherently generated by the modulation process of each modulator, thereby providing an improved linear response in the optical signal at the output of the second Mach-Zehnder.

These and other objects, features and advantages of the present invention will become more apparent in light of the detailed description of a best mode embodiment thereof, as illustrated in the accompanying drawings.

BEST MODE FOR CARRYING OUT THE INVENTION

Figure 1:
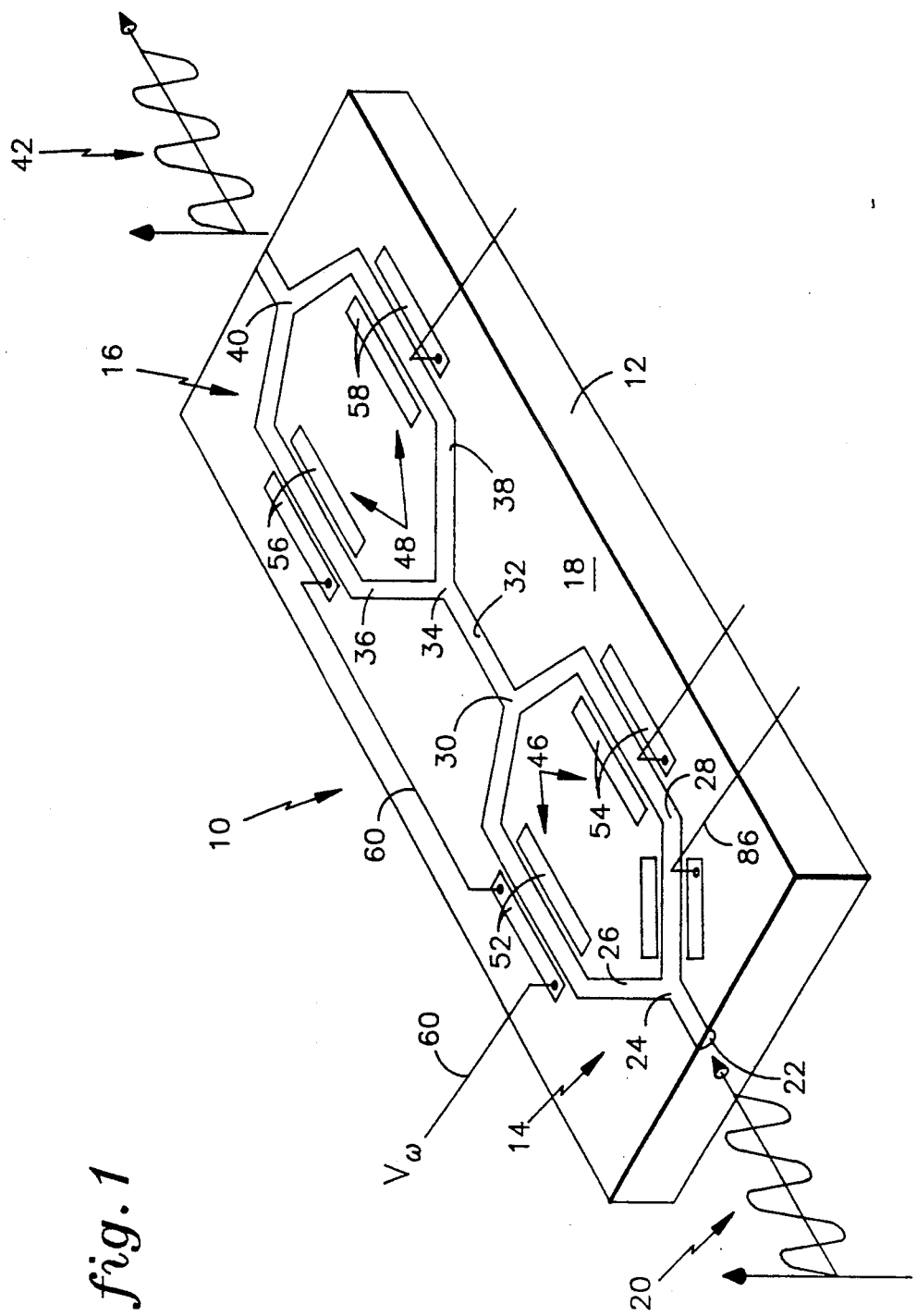
FIG. 1 is a perspective view of an IOC having an arrangement of optical modulators in accordance with the present invention.

FIG. 1 is a perspective view of an IO chip 10 ("IOC") fabricated from a substrate 12 of, e.g., X-cut lithium niobate, $LiNbO_3$, or lithium tantalate, $LiTaO_3$. In accordance with the present invention, the IOC 10 has a pair of series connected (i.e., "cascaded") optical waveguides 14,16 formed on a major surface 18 thereof. The waveguides 14,16 may be formed in a number of well-known ways, including titanium indiffusion, proton exchange, or by an annealed proton exchange ("APE TM") process as disclosed and claimed in U.S. Pat. No. 4,984,861 to Suchoski Jr. et al., and assigned to the assignee of the present invention, and which is hereby incorporated by reference.

Each waveguide 14,16 may be a Mach-Zehnder interferometer. In the first Mach-Zehnder 14, an input optical signal 20 comprising RF energy from, e.g., a laser light source 21 (FIG. 3), enters the Mach-Zehnder at an input port 22 and is split at a Y-junction 24 in the Mach-Zehnder into two equal components. Each component travels in a corresponding arm 26,28 before recombining at an output Y-junction 30.

The recombined optical signal travels in a section 32 of the waveguide to an input Y-junction 34 of the second Mach-Zehnder 16, where it is split into two equal components that traverse inside corresponding arms 36,38. The two light signals recombine at an output Y-junction 40 of the second Mach-Zehnder. The recombined signal 42 represents the optical signal output of the waveguide.

Two optic modulators 46,48 are formed on the IOC surface 18 using known techniques. Each modulator 46,48 comprises, e.g., two pairs of electrodes 52,54,56,58, one pair disposed on each side of an associated arm 26,28,36,38. The term "Mach-Zehnder" thus refers to the combination of the waveguide Y-junctions 24,30,34,40 and arms 26,28,36,38, along with the modulators 46,48.

A time varying voltage, $V_w$, is fed as a traveling wave, or on a corresponding signal line 60, from an RF source 61 (FIG. 3) to electrode pairs 52,56. The RF source provides the information to be modulated onto, and, thus, transmitted by, the carrier optical signal 20.

The voltage $V_w$ produces an electric field in the IOC substrate 12. In accordance with the well-known electrooptic effect, the electric field effectively changes the relative indices of refraction, and, thus, the optical path lengths of the waveguide arms 26,36. Modulation occurs since the relative phase of the optical signals at the corresponding output Y-junctions 30,40 vary according to the instantaneous amplitude of the time varying voltage $V_w$. The varying phase relationship between the optical signals traversing in the waveguide arms results in a varying amplitude of the intensity of the recombined optical signal 42 at the interferometer output.

Figure 2:
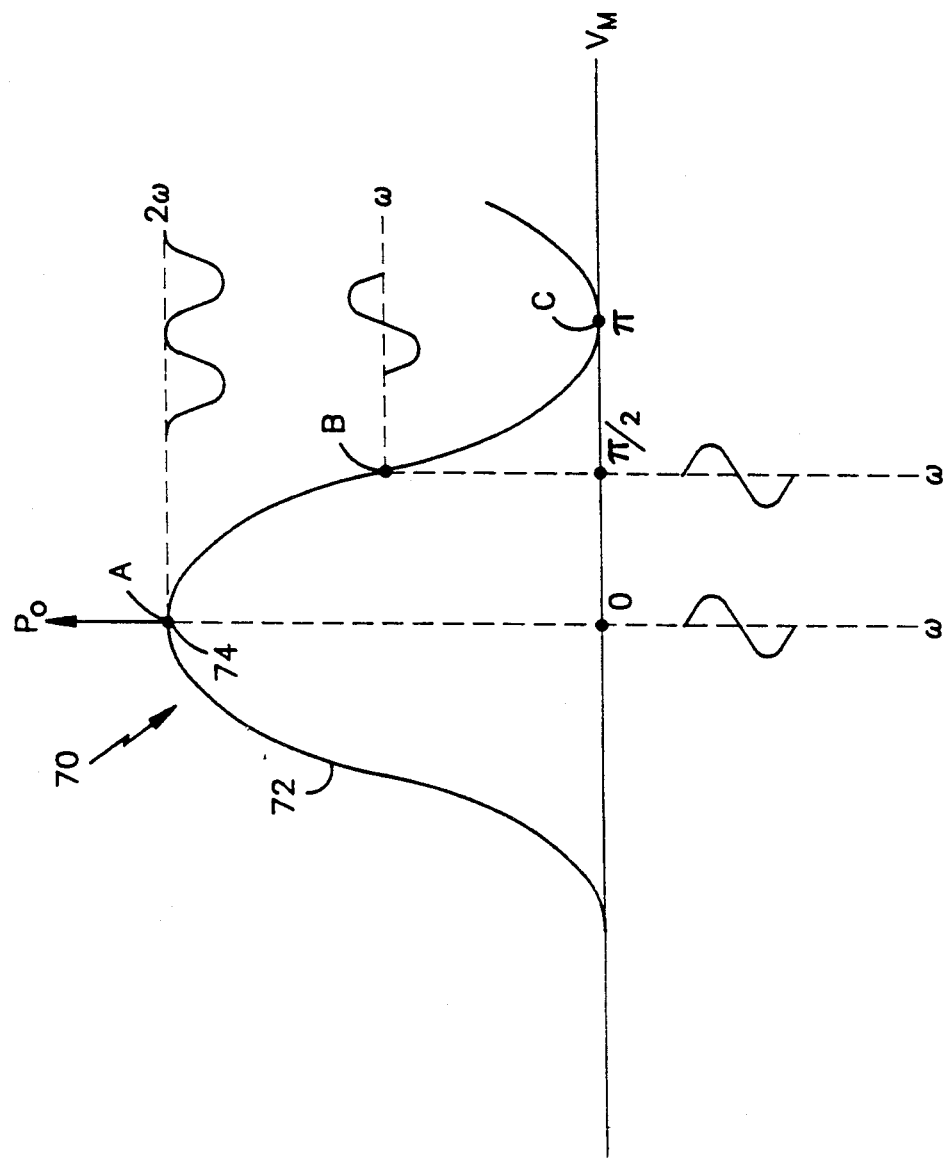
FIG. 2 is a graph of the transfer function of a Mach-Zehnder interferometer formed on a surface of the IOC of FIG. 1.

FIG. 2 is a graph 70 of the transfer function of a typical electrooptic modulator. The transfer function 70 is a nonlinear cosine curve 72. The abscissa represents the voltage, $V_m$, applied to the electrodes. $V_m$ is the total of any DC voltage plus the instantaneous amplitude of any time varying voltage, $V_w$, applied to the electrodes. The ordinate represents optical power output, $P_o$, of the Mach-Zehnder, as typically sensed by a detector (not shown).

Referring also to FIG. 1 again, the input optical signal 20 divides equally between the arms 26,28 in the first Mach-Zehnder 14. With zero voltage applied to the pair of electrodes 52, the optical signals recombine in phase with each other at the output Y-junction 30 of the first Mach-Zehnder 14. Thus, the optical signal at the first Mach-Zehnder output is essentially similar to the input optical signal 20. This phenomenon is described in more detail in U.S. Pat. No. 5,040,865 to Chen et al, which is hereby incorporated by reference.

The optical signal propagates to the input Y-junction 34 of the second Mach-Zehnder 16, where it is split into two equal components. With zero voltage applied to the pair of electrodes 56, the optical signals recombine in phase with each other at the output Y-junction 40 of the second Mach-Zehnder 16 (assuming the signals were in phase at the input Y-junction 34 of the second Mach-Zehnder). Thus, the optical signal 42 at the output of the second Mach-Zehnder is essentially similar to the optical signal 20 input to the first Mach-Zehnder. The condition where zero voltage is applied to any modulator is indicated at point A 74 on the graph 72 of FIG. 2.

By applying a DC voltage of $V_m = \pi$ to either pair of modulators, the optical signals in the corresponding arms traverse different effective path lengths such that the optical signals are 180° out of phase when recombined. Thus, the signal amplitudes cancel each other out and a zero-amplitude optical signal output is produced at the corresponding Mach-Zehnder output. This condition is indicated at point C on the graph of FIG. 2.

For approximate linear operation of any modulator, a DC voltage of $V_m = \pi/2$ is applied to the modulator. This condition is indicated at point B on the graph of FIG. 2. It is at this point that modulator operation is desired. The aforedescribed prior art attempts at linearizing the modulator have attempted to widen the linear range of the transfer function in the vicinity of point B.

The graph of FIG. 2 also illustrates the effect of applying a time varying voltage signal, $V_w$, of angular frequency w to a modulator. For operation at point B, the instantaneous total voltage applied to a modulator is $V_m = \pi/2 + V_w$. Because operation of the modulator is in the approximate linear region of the transfer function, the Mach-Zehnder's output signal is also at frequency w.

By operating a modulator at point A, the instantaneous total voltage applied to a modulator is now $V_m = V_w$, since the DC voltage is zero. Operation in this region produces nonlinear electrooptic response of the material in IOC substrate. The Mach-Zehnder's output signal is now twice the modulation frequency; i.e., a fundamental frequency of 2 w. Also generated are harmonics of the fundamental frequency at even integral multiples; e.g., 4 w, 8 w, etc. Thus, it can be seen from the foregoing that modulator operation away from point B yields intermodulation harmonics. As described hereinbefore in regards to an exemplary CATV system, such harmonics are undesirable.

Figure 3:
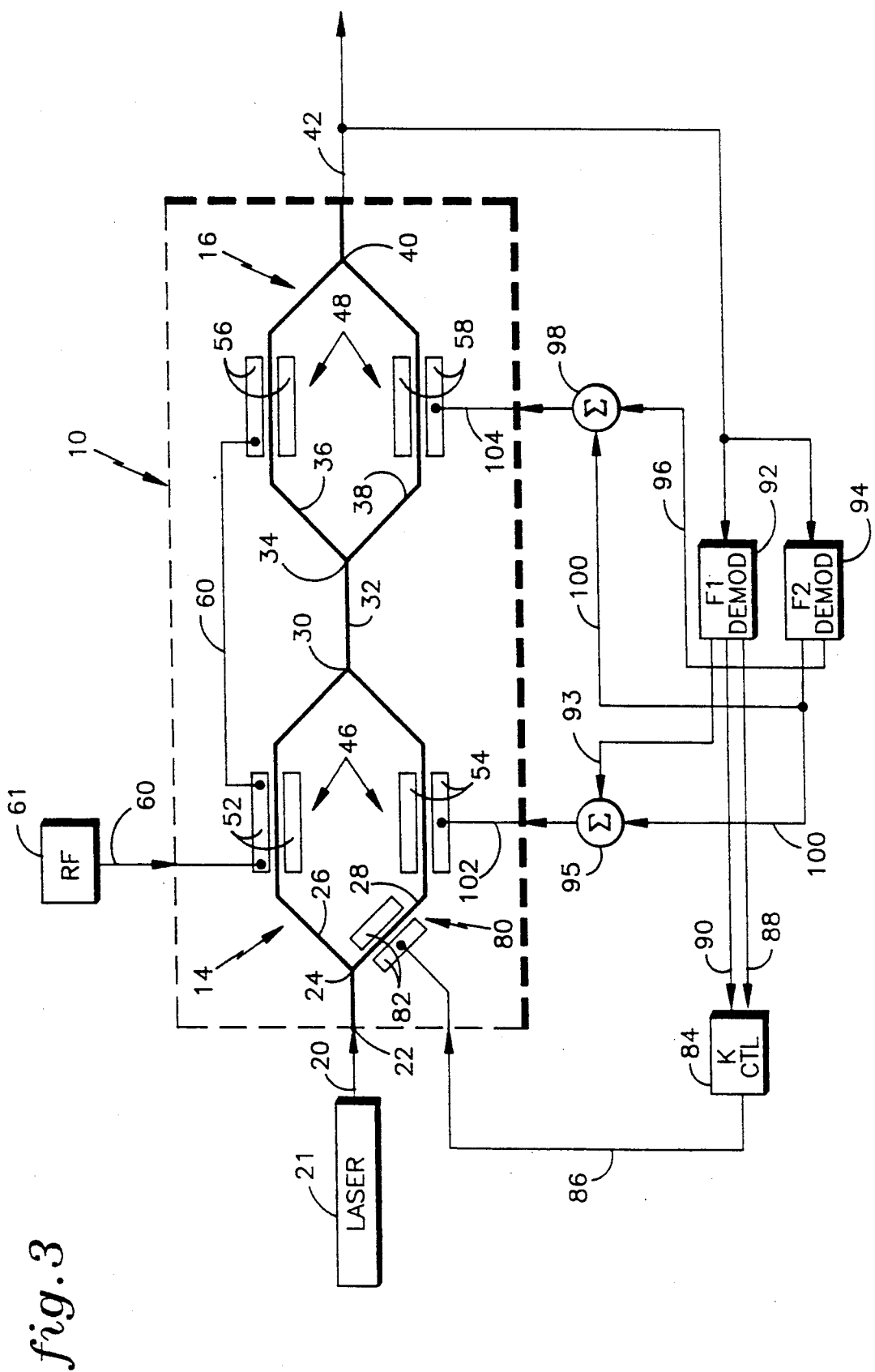
FIG. 3 is a block diagram of the IOC of FIG. 1 with additional apparatus in accordance with the present invention.

In FIG. 3 is illustrated a block diagram of the apparatus of the present invention. The IOC 10 of FIG. 1 is illustrated with two Mach-Zehnders 14,16 and corresponding modulators 52-58. The first Mach-Zehnder 14 is configured to have a transfer function of:

$$1 + k^*\cos(x) \tag{Eq. 1}$$

The second Mach-Zehnder 16 is configured to have a transfer function of:

$$1 + \Phi_1^*\sin(x) + \Phi_2^*\cos(x) \tag{Eq. 2}$$

The overall transfer function of the cascaded Mach-Zehnder pair is:

$$(1 + k^*\cos(x))^*(1 + \Phi_1^*\sin(x) + \Phi_2^*\cos(x)) \tag{Eq. 3}$$

The variable x represents the time varying voltage signal on the line 60 from the RF source 61. The variables $\Phi_1$ and $\Phi_2$ represent phase offsets applied to the corresponding first and second modulators. Such modulator configuration and phase biases are accomplished by selectively biasing the modulators 54,58 with an appropriate DC voltage, as described hereinafter. The term k, which has a value of less than one, is the contrast of the first modulator 46. The contrast is the ratio of amount of optical signal in arm 26 to the amount of optical signal in arm 28. The contrast may be adjusted by apportioning the amount of the input optical signal between the two arms 26,28 of the first modulator, using means described in detail hereinafter.

Multiplying out Eq. 3 yields:

$$1 + k^*\cos(x) + \Phi_1^*\sin(x) + k^*\Phi_1^*\cos(x)^*\sin(x) + \Phi_2^*\cos(x) + k^*\Phi_2^*\cos^2(x) \tag{Eq. 4}$$

The term $k^*\Phi_1^*\cos(x)^*\sin(x)$ may be simplified as:

$$\tfrac{1}{2}{*}k^*\Phi_1^*\sin(2x) \tag{Eq. 5}$$

The term $k^*\Phi_2^*\cos^2(x)$ may be simplified as:

$$\tfrac{1}{2}{*}k^*\Phi_2^*(1 + \cos(2x)) \tag{Eq. 6}$$

Eq. 4 may now be rewritten as:

$$1 + k^*\cos(x) + \Phi_1^*\sin(x) + \tfrac{1}{2}{*}k^*\Phi_1^*\sin(2x) + \Phi_2^*\cos(x) + \tfrac{1}{2}{*}k^*\Phi_2 + \tfrac{1}{2}{*}k^*\Phi_2^*\cos(2x)) \tag{Eq. 7}$$

Expanding the terms containing either sin or cos using a Maclaurin series expansion yields:

$$\Phi_1^*\sin(x) = \Phi_1[x - 1/6^*x^3 + 1/120^*x^5 - \ldots] \tag{Eq. 8}$$

$$(k + \Phi_2)(\cos(x)) = (k + \Phi_2)[1 - \tfrac{1}{2}{*}x^2 + 1/24^*x^4 - \ldots] \tag{Eq. 9}$$

$$(\tfrac{1}{2}{*}k^*\Phi_1)(\sin(2x)) = (\tfrac{1}{2}{*}k^*\Phi_1)[2x - 8/6^*x^3 + 32/120^*x^5 + \ldots] \tag{Eq. 10}$$

$$(\tfrac{1}{2}{*}k^*\Phi_2)\cos(2x) = (\tfrac{1}{2}{*}k^*\Phi_2)[1 - 2x^2 + 2/3^*x^4 - \ldots] \tag{Eq. 11}$$

Grouping terms yields:

$$DC:\ 1 + (\tfrac{1}{2}{*}k^*\Phi_2) + (k + \Phi_2) + (\tfrac{1}{2}{*}k^*\Phi_2) \tag{Eq. 12}$$

$$x:\ \Phi_1 + k^*\Phi_1 = \Phi_1(1 + k) \tag{Eq. 13}$$

$$x^2:\ -(\tfrac{1}{2}{*}k^*\Phi_2) - k^*\Phi_2 = -k/2 - \Phi_2/2 - k^*\Phi_2 \tag{Eq. 14}$$

$$x^3:$$
$$-\Phi_1/6 - (\tfrac{1}{2}{*}k^*\Phi_1)(8/6) = -1/6(\Phi_1 + 4^*k^*\Phi_1) = -1/6^*\Phi_1(1 + 4^*k) \tag{Eq. 15}$$

$$x^4:$$
$$(k + \Phi_2)/24 + (k + \Phi_2)/3 = k/24 + \Phi_2/24 + (k^*\Phi_2)/3 \tag{Eq. 16}$$

$$x^5:$$
$$\Phi_1/120 + (\tfrac{1}{2}{*}k^*\Phi_1)(32/120) = \Phi_1(1/120 + k^*16/120) = \Phi_1/120(1 + 16^*k) \tag{Eq. 17}$$

Thus, the second and third order terms above (i.e., Eqs. 14 and 15, respectively) are indicative of the second and third harmonics in the intermodulation distortion. By solving these equations for both $x^2$ and $x^3$ equal zero, the appropriate values for the contrast k and phase angles $\Phi_1$ and $\Phi_2$ may be obtained. Solving Eq. 15 for $x^3 = 0$ yields a value of $-\tfrac{1}{4}$ for the contrast, k. Inserting this value for k into Eq. 14 and solving for $x^2 = 0$ yields a value for $\Phi_2$ of 0.5 and $\Phi_1$ of 0.86602. The inverse sin of 0.5 yields an angle of 30°. These are different because the more complete numerical iterative solutions take higher order terms into account. Examination of the resulting response and laws of symmetry yield a further improvement: without further analysis the harmonic terms can be minimized by splitting the phase offset equally between the two modulators. Thus, $\Phi_1 = +15°$ and $\Phi_2 = -15°$.

Thus, to minimize the third order term in the trigonometric expansion of the cascaded modulator transfer function (Eq. 3), k is set to $-\tfrac{1}{4}$. To minimize the second order term in the trigonometric expansion of the cascaded modulator transfer function, $\Phi_1$ is set to $+15°$ and $\Phi_2$ is set to $-15°$. In implementing the apparatus of the present invention, the foregoing trigonometric expansion was applied to a mathematical optimization software program, such as the commercially available Mathcad program. Such software optimization yielded a value of 0.92258/4 for the contrast k, and values of $+/- 14.077°$ for $\Phi_1$ and $\Phi_2$.

Inserting the above derived values for k, $\Phi_1$ and $\Phi_2$ into Eqs. 16 and 17 yields values of $x^4 \approx -1/32$ and of $x^5 = -2.6/120$. These values represent the magnitudes of the fourth and fifth order terms in the trigonometric expansion of the cascaded modulator transfer function (Eq. 3), and, thus, the magnitudes of the fourth and fifth order harmonics in the intermodulation distortion. From these relatively small values for $x^4$ and $x^5$, the cascaded modulator arrangement of the present invention yields no appreciable fourth and fifth order harmonics.

From the foregoing mathematical analysis, the second and third harmonic terms of the trigonometric expansion of the composite transfer function in Eq. 3 go to zero for specific values of contrast k, and phase adjustment $\Phi_1$ and $\Phi_2$. By controlling the contrast of the first modulator, the third harmonic can be significantly reduced. Further, by adjusting the phase of each modulator, with respect to each other and to the RF modulation, the second harmonic can also be significantly reduced.

Referring again to FIGS. 1 and 3, a cutoff modulator 80 is formed as a pair of electrodes 82 on the IOC major surface 18 in a similar manner to the optic modulators 46,48. The cutoff modulator 80 apportions the amount of the optical input signal 20 between the two arms 26,28 of the first Mach-Zehnder 14 to set the contrast k. The modulator is fabricated, e.g., in the vicinity of one arm 28 of the first Mach-Zehnder. However, it is to be understood that the cutoff modulator 80 may instead be fabricated in conjunction with the second Mach-Zehnder 16, without departing from the broadest scope of the present invention.

In practice, the accuracy of k is not strict. For example, to achieve a 20 dB reduction in the third harmonic, k must be set to an accuracy of 10%. Other optical means may be employed, besides the cutoff modulator so described, to apportion the light between the two arms.

The amount of contrast is controlled by a contrast control circuit 84 which provides a signal on a line 86 to the cutoff modulator 80. The contrast circuit is responsive to a pair of electrical signals: a first signal on a line 88 indicative of the average DC voltage value of the optical output signal 42 from the second Mach-Zehnder; a second signal on a line 90 indicative of the average DC voltage value of the first harmonic of the optical output signal 42. The contrast circuit 84 compares these two signals 88,90 and adjusts the contrast accordingly. The contrast control circuit may comprise a commonly available analog multiplier configured as a divider.

The optical signal 42 at the output of the second Mach-Zehnder 16 is provided to each of a pair of known synchronous demodulator or lock-in amplifier circuits 92,94. The circuits 92,94 may be the Model AD640 DC Coupled Demodulating Amplifier provided by Analog Devices. The first demodulator 92 demodulates the first harmonic from the optical output of the second Mach-Zehnder. The circuit 92 provides the DC voltage signal indicative of the average DC voltage value of the first harmonic on the line 90 to the contrast circuit 84. The first demodulator also provides the proper DC voltage value to bias the optic modulator 54 at $\Phi_1 = +15°$, on a line 93 that is fed to an input of a first summer 95.

The second demodulator 94 demodulates the second harmonic from the output of the second Mach-Zehnder. The circuit provides the proper DC voltage value, on a line 96, to bias the optic modulator 58 at $\Phi_2 = -15°$. The signal line is fed to one input of a second summer 98.

The second demodulator also provides a dither signal on a line 100 to an input of each of the first and second summers 95,98. The summers sum the dither signal with the corresponding DC voltage signal on the lines 93,96 and provide the summed signals on lines 102,104 to the respective modulators 54,58. The dither signal is at a frequency equal to the second harmonic of the optical signal 42 at the output of the second Mach-Zehnder 16. Biasing the modulators 54,58 with a dither signal at the frequency of the second harmonic controls the bias point of each modulator for reduction of the third harmonic. In an exemplary embodiment of the apparatus of the present invention, the cascaded modulator arrangement achieved as much as a 35 dB improvement in reduction in the third order harmonic, as compared to a normal Mach-Zehnder.

Thus, the first modulator creates a DC multiplier for the modulation products of the second modulator, and generates a controlled magnitude second harmonic whose product with the sin(x) term, in the second modulator creates a new third harmonic which cancels out the third harmonic generated by the sin(x) term in the second stage. Phase offset of the two modulators is then adjusted to null out any resulting second harmonic from the two modulators.

Normally, detecting and correcting the third harmonic is difficult because of the high frequency of the third harmonic, which makes it difficult to apply a correction with the correct magnitude and phase. In the present invention, a controlled contrast term, k, is used to apply the correction term.

Since the harmonic correction is applied optically in accordance with the present invention, the input RF modulation need only have a bandwidth consistent with the information bandwidth, and not a bandwidth three times as great, as would be needed for the aforedescribed predistortion schemes in the prior art. The composite device bandwidths can be as great as the optic modulator itself provides. For example, traveling wave optic modulators may be arranged in cascade with attention paid to propagation delays that would allow linearization out into the microwave spectrum The cascaded optic modulator arrangement of the present invention has an advantage over prior art parallel optic schemes in that splitting losses are avoided by passing the optical signal through a single path. Further, a single source is used, and the source wavelength can be as pure as needed. This is not possible in schemes employing incoherent summing of the correction term. Still further, the third order harmonic is trigonometrically added in the optical domain; thus, in no way limiting any electronics either on the transmit or receive end.

As more and more uses in the telecommunications, radio and television industries for optic links arise, stringent requirements are being imposed on the linearity of the optic modulators. Large efforts are underway to discover linear techniques for modulation. Solid state lasers have been improved greatly in the areas of linearity and bandwidth. However, the present invention could conceivably surpass direct modulated lasers, especially at high power levels.

The invention has been described with Mach-Zehnder interferometers fabricated on a surface of the IOC. However, it is to be understood that other types of interferometers, such as Balanced Bridge, may be used in light of the teachings herein without departing from the spirit and scope of the present invention. Further, the invention has been described as being fabricated on an integrated optical device. The invention may, if desired, be practiced instead with an all-fiber type of system using commercially available discrete interferometric and modulation devices.

It is to be understood that the contrast control circuit 84, the demodulators 92,94 and the summers 95,98 described herein are purely exemplary; other means for adjusting the contrast of the RF energy in one interferometer and for biasing the modulators 54,58 may be utilized, if desired, in light of the teachings herein and their use should be apparent to one of ordinary skill in the art. It suffice for the present invention that the phase offset of both modulators, and contrast of one modulator, are adjusted to minimize both second and third order harmonics inherently generated by the modulation process of each modulator, thereby providing an improved linear response in the optical signal at the output of the second Mach-Zehnder.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

We claim:

1. An Integrated Optic ("IO") device for propagating radio frequency ("RF") energy therethrough, comprising:

a substrate of IO material having a major surface;

first waveguide means, formed on said major surface, and having two or more paths, for propagating the RF energy therein to an output thereof, and including a pair of modulator means formed on said major surface in the vicinity of said first waveguide means for varying the phase of the RF energy propagating in said first waveguide means;

second waveguide means, formed on said major surface, having two or more paths and being disposed after said output of said first waveguide means, for propagating the RF energy therein to an output thereof, and including a pair of modulator means formed on said major surface in the vicinity of said ssecond waveguide means for varying the phase of the RF energy propagating in said second waveguide means;

contrast modulator means, formed on said major surface in the vicinity of either said first waveguide means or said second waveguide means, for apportioning, in response to a contrast signal, the RF energy between said paths of the corresponding one of said first or second waveguide means in a predetermined amount that minimizes a third harmonic of the RF energy appearing at said output of said second waveguide means; and bias means, for biasing a phase offset of one of said pair of modulator means of said first waveguide means and for biasing a phase offset of one of said pair of modulator means of said second waveguide means, said biased phase offsets being a predetermined value so as to minimize a second harmonic of the RF energy at said output of said second waveguide means.

2. The IO device of claim 1, wherein said first waveguide means comprises a Mach-Zehnder interferometer.

3. The IO device of claim 2, wherein said Mach-Zehnder interferometer is configured to have a transfer function of $1+k*\cos(x)$, where k is said apportioned RF energy as apportioned by said contrast modulator means.

4. The IO device of claim 1, wherein said second waveguide means comprises a Mach-Zehnder interferometer.

5. The IO device of claim 4, wherein said Mach-Zehnder interferometer is configured to have a transfer function of $1+\Phi_1*\sin(x)+\Phi_2*\cos(x)$, where $\Phi_1$ is said phase offset of said one of said pair of said modulator means of said first waveguide means, and $\Phi_2$ is said phase offset of said one of said pair of said modulator means of said second waveguide means.

6. The IO device of claim 1, wherein said first waveguide means comprises a Balanced-Bridge interferometer.

7. The IO device of claim 1, wherein said second waveguide means comprises a Balanced-Bridge interferometer.

8. The IO device of claim 1, wherein said IO material comprises lithium niobate.

9. The IO device of claim 1, wherein said IO material comprises lithium tantalate.

10. The IO device of claim 1, wherein said bias means further comprises:

first demodulator means, for demodulating a first harmonic of the RF energy appearing at said output of said second waveguide means and for providing a signal indicative of the average DC voltage value of said first harmonic, for providing a signal indicative of the average DC voltage value of the RF energy appearing at said output of said second waveguide means, and for providing a signal indicative of said predetermined biased phase offset to said one of said pair of said modulator means of said first waveguide means;

second demodulator means, for demodulating a second harmonic of the RF energy appearing at said output of said second waveguide means and for providing a dither signal at a frequency equal to said second harmonic, and for providing a signal indicative of said predetermined biased phase offset to said one of said pair of said modulator means of said second waveguide means; and contrast circuit means, for comparing said signal indicative of the average DC voltage value of said first harmonic and said signal indicative of the average DC voltage value of the RF energy appearing at said output of said second waveguide means, and for providing said contrast signal to said contrast modulator means as a result of said comparison.

11. The IO device of claim 10, further comprising:

first summing means, for summing said signal indicative of said predetermined biased phase offset with said dither signal and for providing a signal indicative of said predetermined biased phase offset to said one of said pair of said modulator means of said first waveguide means; and second summing means, for summing said signal indicative of said predetermined biased phase offset with said dither signa and for providing a signal indicative of said predetermined biased phase offset to said one of said pair of said modulator means of said second waveguide means.

12. Apparatus, comprising:

first waveguide means, having two or more paths, for propagating the RF energy therein to an output thereof, and including a pair of modulator means disposed in the vicinity of said first waveguide means for varying the phase of the RF energy propagating in said first waveguide means;

second waveguide means, having two or more paths and being disposed after said output of said first waveguide means, for propagating the RF energy therein to an output thereof, and including a pair of modulator means disposed in the vicinity of said second waveguide means for varying the phase of the RF energy propagating in said second waveguide means;

contrast modulator means, disposed in the vicinity of either said first waveguide means or said second waveguide means, for apportioning, in response to a contrast signal, the RF energy between said paths of the corresponding one of said first or second waveguide means in a predetermined amount that minimizes a third harmonic of the RF energy appearing at said output of said second waveguide means; and bias means, for biasing a phase offset of one of said pair of said modulator means of said first waveguide means and for biasing a phase offset of one of said pair of said modulator means of said second waveguide means, said biased phase offsets being a predetermined value so as to minimize a second harmonic of the RF energy at said output of said second waveguide means.

13. The apparatus of claim 12, wherein said first waveguide means comprises a Mach-Zehnder interferometer.

14. The IO device of claim 13, wherein said Mach-Zehnder interferometer is configured to have a transfer function of $1+k^*\cos(x)$, where k is said apportioned RF energy as apportioned by said contrast modulator means.

15. The IO device of claim 12, wherein said second waveguide means comprises a Mach-Zehnder interferometer.

16. The IO device of claim 15, wherein said Mach-Zehnder interferometer is configured to have a transfer function of $1+\Phi_1^*\sin(x)+\Phi_2^*\cos(x)$, where $\Phi_1$ is said phase offset of said one of said pair of said modulator means of said first waveguide means, and $\Phi_2$ is said phase offset of said one of said pair of said modulator means of said second waveguide means.

17. The IO device of claim 12 wherein said first waveguide means comprises a Balanced-Bridge interferometer.

18. The IO device of claim 12 wherein said second waveguide means comprises a Balanced-Bridge interferometer.

19. The IO device of claim 12, wherein said bias means further comprises:

first demodulator means, for demodulating a first harmonic of the RF energy appearing at said output of said second waveguide means and for providing a signal indicative of the average DC voltage value of said first harmonic, for providing a signal indicative of the average DC voltage value of the RF energy appearing at said output of said second waveguide means, and for providing a signal indicative of said predetermined biased phase offset to said one of said pair of said modulator means of said first waveguide means;

second demodulator means, for demodulating a second harmonic of the RF energy appearing at said output of said second waveguide means and for providing a dither signal at a frequency equal to said second harmonic, and for providing a signal indicative of said predetermined biased phase offset to said one of said pair of said modulator means of said second waveguide means; and contrast circuit means, for comparing said signal indicative of the average DC voltage value of said first harmonic and said signal indicative of the average DC voltage value of the RF energy appearing at said output of said second waveguide means, and for providing said contrast signal to said contrast modulator means as a result of said comparison.

20. The IO device of claim 19, further comprising:

first summing means, for summing said signal indicative of said predetermined biased phase offset with said dither signal and for providing a signal indicative of said predetermined biased phase offset to said one of said pair of said modulator means of said first waveguide means; and second summing means, for summing said signal indicative of said predetermined biased phase offset with said dither signal and for providing a signal indicative of said predetermined biased phase offset to said one of said pair of said modulator means of said second waveguide means.

* * * * *

UNITED STATES PATENT AND TRADEMARK OFFICE
CERTIFICATE OF CORRECTION

PATENT NO. : 5,168,534

DATED : December 1, 1992

INVENTOR(S) : Gregory J. McBrien et al

It is certified that error appears in the above-identified patent and that said Letters Patent is hereby corrected as shown below:

Claim 1, Column 9, line 48, "ssecond" should be --second--.

Claim 11, Column 10, line 67 "signa" should be --signal--.

Signed and Sealed this

Eleventh Day of January, 1994

Attest:

BRUCE LEHMAN

Attesting Officer

Commissioner of Patents and Trademarks